INVENTOR.
FREDERICK A. SCHWERTZ
BY
Stanley J Cole
ATTORNEY

Nov. 23, 1965  F. A. SCHWERTZ  3,220,012
SIMULTANEOUS RECORDING AND DISPLAY SYSTEM
Filed May 3, 1962  3 Sheets-Sheet 2

INVENTOR.
FREDERICK A. SCHWERTZ
BY
Stanley Z. Cole
ATTORNEY

Nov. 23, 1965    F. A. SCHWERTZ    3,220,012
SIMULTANEOUS RECORDING AND DISPLAY SYSTEM
Filed May 3, 1962    3 Sheets-Sheet 3

INVENTOR.
FREDERICK A. SCHWERTZ
ATTORNEY 3,220,012
SIMULTANEOUS RECORDING AND
DISPLAY SYSTEM
Frederick A. Schwertz, Pittsford, N.Y., assignor to Xerox Corporation, Rochester, N.Y., a corporation of New York
Filed May 3, 1962, Ser. No. 192,233
17 Claims. (Cl. 346—74)

The present invention relates to the electrostatic recording of signal intelligence and the simultaneous visual presentation thereof and is a continuation in part of my copending application Serial No. 638,008, filed February 4, 1957.

At the present time display devices employing luminescent materials are in wide use. Materials of this type have been employed both in the faces of cathode ray tubes where they are excited to luminescence by an electron beam and as separate panel-like display screens where they are excited to luminescence by the direct application of a varying electric field. By proper phosphor selection cathode ray tube screens may be fabricated which will continue to luminesce for relatively long or relatively short periods after excitation. These materials are generally characterized as high persistence or low persistence. In contrast presently known field-excitable materials all have low persistence after removal of the exciting field.

Owing to the relatively low light level and the short existence of images presented by exciting low persistence materials, permanent recording of these images by conventional recording techniques simultaneous with their viewing has been difficult if not impossible, in many instances. On the other hand the use of high persistence display screens to facilitate conventional recording techniques restricts the whole system to use with slowly changing images.

In addition conventional recording devices such as movie cameras require an unobstructed view of the display screen thereby preventing close examination of the screen by a viewer.

Accordingly, it is an object of this invention to provide a novel recording and display system.

More particularly, it is an object of this invention to provide a recording and display system incorporating a very high speed recording technique requiring no contact with the record material, and a low persistence display device which may be coupled with a high persistence or image storage device.

It is a further object of this invention to provide a system which can record and display a great variety of input data.

It is also an object of this invention to provide a recording and display system in which permanent recording may take place while an observer is closely examining the display screen.

It is also an object of this invention to provide a novel method of recording and display.

The above and still further objects, features and advantages of the present invention will become apparent upon consideration of the following detailed disclosure of specific embodiments of the invention, especially when taken in conjunction with the accompanying drawings wherein.

Figure 1:
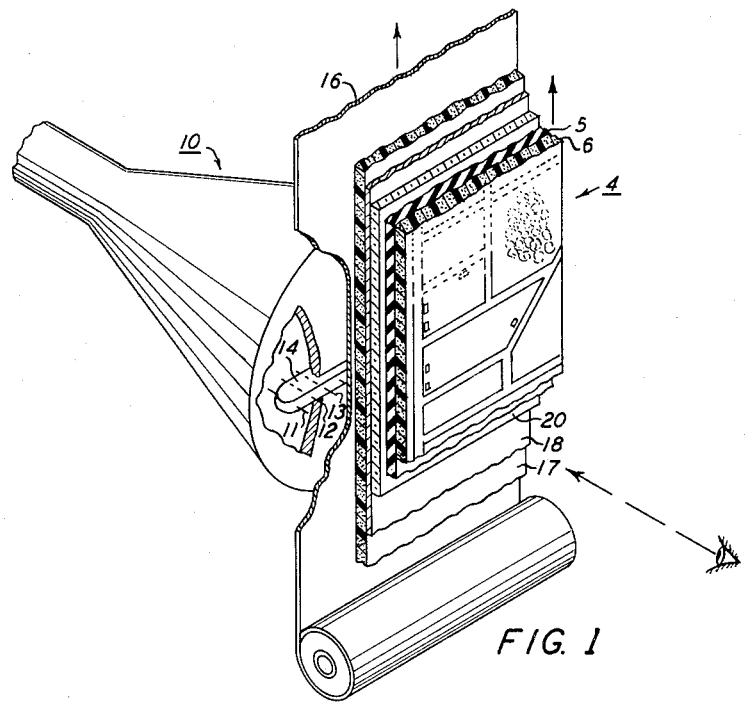
FIGURE 1 is an isometric view of one embodiment of this invention employing a cathode ray pin-tube.
Figure 2:
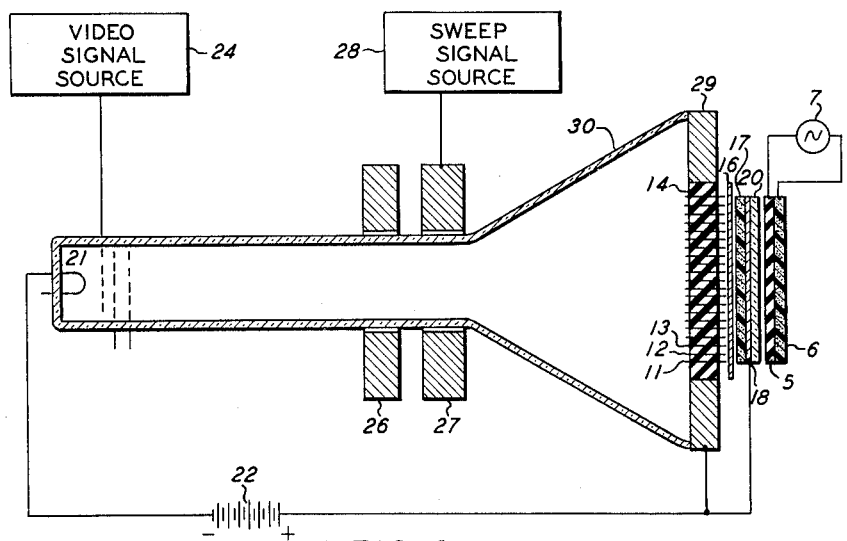
FIGURE 2 is a top-sectional view taken through the FIGURE 1 embodiment.

Referring now to FIGURE 1 of the drawings, there is illustrated an electrostatic writing tube or cathode ray pin-tube 10, incorporating a number of conductive writing wires 11, 12, 13, etc., embedded in an insulator 14 in the tube face. On the outside of the tube the ends of these conducting wires form a column of writing points. A tube of this type is shown in U.S. Patent 3,001,848 to Walkup (FIG. 2). A dielectric recording material 16 is moved past the writing column in a direction normal to the column. This recording material which, for example, might be insulating paper, Mylar, polyethylene coated paper, or other insulating material on the order of one or two mils thick is spaced on the order of a few thousandths of an inch from the wire column depending on applied voltage, humidity conditions, and ambient ionization. Immediately behind the recording web 16 is an electroluminescent layer 17 comprising a dielectrically embedded material of the type which may be excited to luminescence by subjection to a varying electric field from either alternating current or one or more D.C. pulses. These materials, which are referred to in the art as phosphors, generally consist of silicon carbide or zinc sulfide, activated with small amounts of lead, copper or manganese. Since the brightness produced in these "phosphors" depends critically on the field produced in them, an imbedding matrix with a high dielectric constant is selected as it provides a means for supporting a high electric field in the phosphor. Polyvinyl chlorides with dielectric constants ranging from 6.5 to 12 have proved acceptable in this respect; however, where brightness is critical, barium titanate may be mixed with the phosphor in the matrix to raise the average dielectric constant for the whole layer. The dielectric matrix may be sufficiently conducting to allow any charge deposited on it as it is excited to be drained off through the conductive layer 43 before it again reaches the display station or alternatively a relatively non-conducting dielectric may be used and deposited charge may be drained from this layer after phosphor excitation by connection with a sliding contact 43 above the printing and display station. Another way of quickly removing any deposited charge from this layer is to cover it with a very thin coating of a grounded conductive anti-static compound such as is used on phonograph records. These anti-static compounds are salts of high molecular weight organic compounds such as quaternary ammonium salts, sodium polyacrylate or the like. Charge removal is necessary with D.C. pulse actuation since if charge were retained on the electroluminescent layer it could not be again actuated in its charge retaining region by a pulse of the same magnitude and polarity because this type of material may be actuated only by the application of a changing field. Backing up the luminescent layer is a grounded transparent conductive electrode 18 made of a very thin coating of tin oxide, copper iodide, or the like on a flexible transparent supporting layer 20 such as Mylar. Alternatively, the transparent conductive electrode may be fixed and separate from the luminescent layer.

As the recording and display members 16 and 17–20 respectively are moved past the wire writing column in a direction perpendicular to the wire column as indicated by the arrows in FIGURE 1, selected wires in the writing column are struck by the electron beam when its intensity is high and thus are brought to a potential sufficiently high to effect an ionizing or field discharge from the selected wires across the small air gap, through the recording medium 16 and the electroluminescent layer 17 to the conductive layer 18 which is grounded. The tube may also include a second electron gun to bias all the wires just below discharge potential. External gap preparation comprising forming ions in the gap by subjecting it to a radioactive source as taught by members 51–55 in FIGURE 7 of U.S. Patent 3,001,848 to Walkup or applying an ultraviolet light to the backing electrode as taught in my copending application S.N. 683,647, Sept. 12, 1957, may also be used. The discharges deposit spots of charge on the dielectric recording medium 16 while simultaneously causing the electroluminescent layer 17 to luminesce in the excited areas below the charge spots. The small spots of light in the electroluminescent layer 17 may be viewed through the transparent backing 20 and the transparent electrode 18 as shown in FIGURE 1. The charge pattern on the recording medium is developed or made visible using conventional xerographic developing techniques as more fully explained hereinafter in connection with FIGURE 3. The image emanating from the electroluminescent layer 17 fades soon after it moves away from the writing wire column. Thus there is provided a permanent record on the recording web 16 and a temporary display from the electoluminescent layer 17.

In view of the very short persistence of the image presented on luminescent layer 17 the image is used to activate or write-in to a longer persistence image storage device 4, when a longer persistence image is necessary or desirable. In this instance a persistron 4 is illustrated which comprises a photoconductive layer 5 such as amorphous selenium, cadmium sulfide or zinc oxide, which may be embedded in a fine opaque insulating grid (not shown) to improve resolution, and an electroluminescent layer 6 which may be of the same materials as the electroluminescent layer described above. Layers 5 and 6 are sandwiched between transparent conductive layers (not shown) similar to layer 18 described above, and these two conductive layers are connected to an A.C. source 7, such as 600 volts at a frequency of 200 c.p.s. When not illuminated the photoconductive layer has quite a high resistance and since the device is designed so that the capacitance of the electroluminescent layer is about 5 times that of the photoconductive layer, the voltage appearing across the electroluminescent layer is a small portion of the total voltage appearing across the two layer sandwich. When a light input triggers the photoconductor its resistance drops drastically with a consequent large increase in the voltage appearing across the electroluminescent layer, causing this layer to glow at the spot where it was triggered. Owing to light feedback from the luminescent layer and the relatively long time required for the photoconductor to revert to its insulating state the whole device has a relatively high persistence which may be varied by varying the frequency and magnitude of the applied voltage or the type and thicknesses of the materials used in its construction.

As shown in FIGURE 2, in addition to the conductive wire columns 11, 12, 13, etc., embedded in the dielectric 14 the cathode ray tube 10 includes a cathode 21 which is biased negative by an operating potential source 22. The positive terminal of this operating potential source is coupled to the conductive layer 18 behind the electroluminescent layer 17 and a control grid 23 is used to control the intensity of the emission from the cathode 21 in response to the output of the video signal source 24. The tube envelope 30 includes a conductive metal face plate 31 also connected to the positive side of the potential source and having a slot at the center thereof wherein there is positioned the plurality of separate writing wires 11, 12, 13, etc., within the dielectric medium 14 such as glass, an epoxy resin, or the like. Around the neck of the tube envelope is a focusing coil 26 which focuses the electrons from the cathode into an electron beam of a width suitable to impinge upon one of the wires in the tube face plate. A focusing coil 26 is followed by a deflection coil 27 which is actuated from a sweep signal source 28. This system may be made to record and display exactly the same image as that seen by a remote camera tube such as a vidicon or an image orthicon by synchronizing the vertical scan of the camera tube with the vertical movement of the recording and display media (16–18) and by synchronizing the horizontal scan of the camera tube with that of the cathode ray tube 10. Beam intensity in the cathode ray tube at each particular point of its scan is controlled in accordance with the image intensity seen at the corresponding point in the scan of the camera tube. This device may be used to record and display the output from almost any device that currently uses a conventional cathode ray tube as its output display mechanism and also in many devices which currently do not utilize a display device because of the necessity of permanently recording the output signal. If it were desired to avoid the use of a cathode ray tube a pin column embedded in an insulator could be used in its place if it were provided with the proper switching circuits similar to those taught in my copending patent application S.N. 683,647 now Patent No. 3,076,968.

Figure 3:
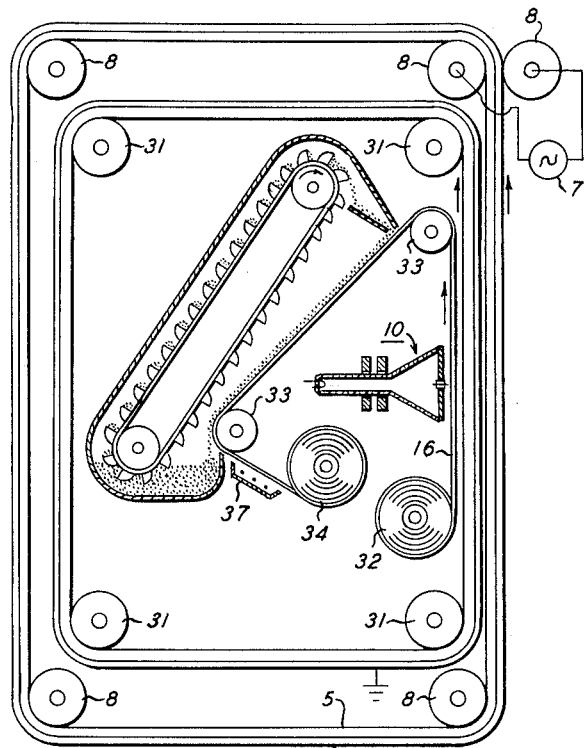
FIGURE 3 is a side view of a complete recording and display system utilizing the apparatus shown in FIGURES 1 and 2.

FIGURE 3 which is a side view of the apparatus shown in connection with FIGURES 1 and 2 shows the display mechanism comprising luminescent layer 17 and transparent conductive layer 18 in the form of an endless belt which is driven around rollers 31 in synchronism with the vertical scan of the video input signal to the cathode ray tube 10. Recording web 16 coming from supply roll 32 moves past the cathode ray pin tube 10 at the same speed as the electroluminescent belt comprising layers 17 and 18. After passing the cathode ray pin tube 10 web 16 then moves around rollers 33 to take up roll 34. In the process it passes a developing unit 36 and a heat fusing unit 37. The illustrated developing unit is of the cascade type which utilizes a two component developing material as more fully described in U.S. Patents 2,618,551 to Walkup, 2,618,552 to Wise, and 2,638,416 to Walkup and Wise. This development system utilizes a relatively coarse grain granular carrier to deposit a finely divided electroscopic material such as resin, hereinafter referred to as toner, on the recording web in charge configuration so that only charged areas of the web are developed. It should be noted at this point that any one of a number of well known techniques for developing electrostatic images might be utilized in connection with this invention. For example, brush development, aerosol, or powder cloud development, liquid spray or, liquid immersion development might be used. After development the image must be fixed in order to provide a permanent record. This may be accomplished by subjecting the developed image to heat, pressure, a solvent spray, or the like. In this instance a resistance heating element 37 which fuses the developer on the recording web is illustrated. FIGURE 3 also shows image write-in to the persistron which is made in the form of an endless belt driven around conductive rollers 8 which are used to supply A.C. potential to it from source 7.

The developing and fixing apparatus illustrated in connection with this figure could also be used with the FIGURE 4 and 5 embodiments explained below so as to make their recordings permanent.

Figure 4:
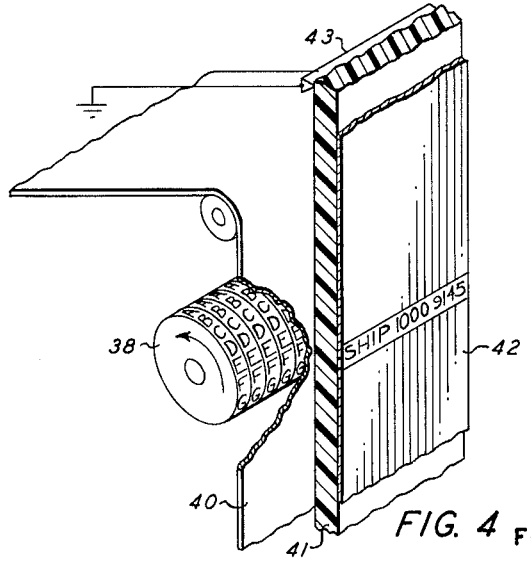
FIGURE 4 is an illustration of a second embodiment of this invention utilizing an alphanumeric line-at-a-time printing cylinder.

FIGURE 4 illustrates the use of a high speed rotating electrostatic alphanumeric printing cylinder 38 in connection with a recording web 40, an electroluminescent layer 41 and a transparent conductor 42 similar to the recording, electroluminescent and transparent conductors of the FIGURE 1 embodiment. As in the embodiment of FIGURES 1 through 3 the electroluminescent material is embedded in a dielectric.

The alphanumeric printing cylinder 38 is of the type disclosed in my U.S. Patent 2,919,967. When the circuitry of that patent is used to actuate the printing cylinder in the FIGURE 4 embodiment of this invention the conductive layer 42 is divided longitudinally into a number of strips equal to the number of character columns on the printing cylinder, each strip being opposite to one character column. If desired these strips may be separated by thin strips of insulating material. In an alternative circuit layer 42 is used as a common electrode for all character columns, and this electrode is grounded. In this instance all the pulses necessary to the printing operation are applied through the alphanumeric cylindrical drum, to each of the character columns which are insulated from each other when the selected character in that particular column is directly opposite the recording and display members. Only this selected character will print out on the record member and be displayed because all other characters in that column are too far from the opposing electrode 42 to allow breakdown in the gap between those characters and electrode 42. For example this system can utilize a hollow tubular character cylinder containing a brush for each character column so as to allow electrical contact between each column and a switch controlled electrical input so as to allow pulsing of each column at a selected point in its rotation.

Figure 5:
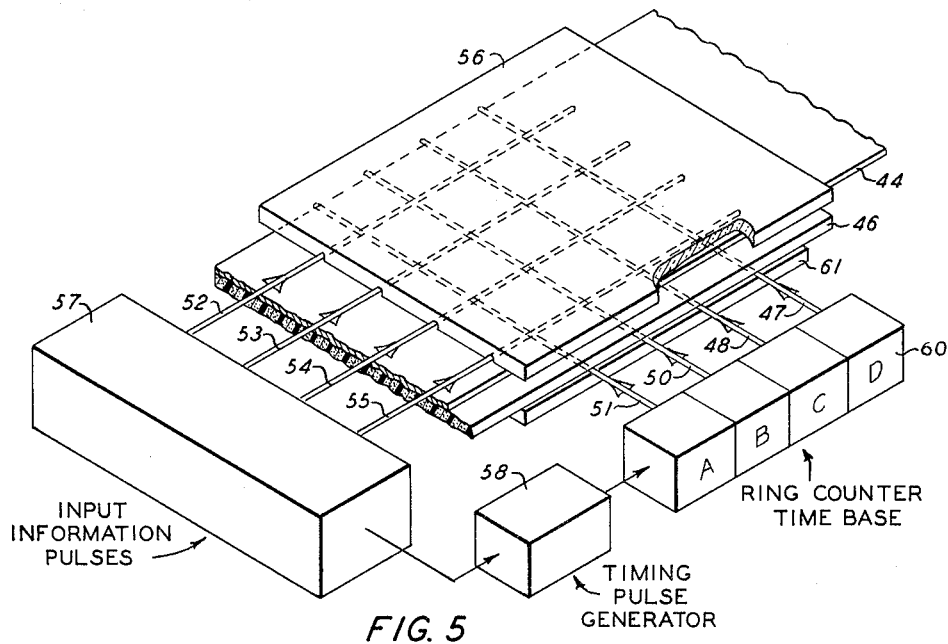
FIGURE 5 illustrates a third embodiment of this invention for recording and displaying a complete image, utilizing stationary recording and display members.

FIGURE 5 shows an embodiment of the invention designed so that one whole picture or a number of lines of data pulses may be recorded and displayed simultaneously while the recording and display members are stationary. The recording and display members are then moved forward between successive recordings and displays. In the event that it is desired to quickly display and record successive images an intermittently operated feeding mechanism such as those used for feeding film through a movie projector is utilized. The recording medium 44 and the luminescent layer 46 are interposed between two orthogonally arranged sets of electrodes, one set including conductors 47, 48, 50, and 51, and the other set including conductors 52, 53, 54, and 55. A small number of widely spaced electrodes are shown here for recording and displaying a binary number output but when recording and displaying a video signal each one of these electrode sets would include a large number of very closely spaced conductors. The illustrated conductors in each set are parallel; however, other conductor configurations may be used so long as those in one electrode set are kept electrically separated. A transparent insulating plate 61 is shown below the uppermost conductor set to support it. Either this device or that disclosed in FIGURE 4 may be used with an image storage device such as the persistron described above.

In accordance with the invention, if any two conductors, one from each set, are electrically activated, an electrostatic point image can be transferred to the paper and displayed on the display screen at a position corresponding to the point of virtual intersection of the activated conductors. In this case a portion of the potential necessary for breakdown in the gap between the conductors is applied to each of the virtually intersecting conductors so that the intersecting conductors give the effect of a great number of coincidence gates making up a matrix in the face of the recording and display device since in order for a discharge to take place at the point of intersection of two conductors both of the conductors must be electrically actuated. For example, if a potential of three hundred volts were required for conduction to take place between conductors 51 and 55 through the electroluminescent and recording layers at the point of virtual intersection of these conductors, a positive 150 volt potential is applied to conductor 55 and a negative 150 volt potential is applied to conductor 51. Obviously, any two potentials could be applied to the two conductors so long as their sum equals the voltage required for conduction across the gap e.g. 100 volts on conductor 55 and —200 volts on conductor 51, 50 volts on conductor 55 and —250 volts on conductor 51, etc. Signal amplification may be necessary in many instances where the input devices have relatively low output; however, amplifiers have not been shown in the circuits described in connection with this invention in order to simplify their illustration.

If, for example, this device is used to record and display data pulses from a four place binary system the two binary values, 1 and 0 might be represented by a pulse and a lack of a pulse. Thus 1011 would be represented by pulse, no pulse, pulse, pulse. While being recorded these pulses and their relative positions could also be viewed from the far side of the electroluminescent layer. The pulses representing one number are yielded simultaneously or in parallel on the conductors 52–55 although they could be serially applied to adjacent conductors if a serial output digital device such as a shift register were used as their input. This binary number output also triggers a timing pulse generator 58 which in turn actuates a ring counter circuit 60 having stages A, B, C, and D arranged in cascade and connected respectively to electrodes 51, 50, 48, and 47. Each time the binary pulses representing a given number are applied from computer 57 a stepping action occurs in the ring counter 60 which is arranged to have the activated stage establish a high voltage on the conductor connected to that particular stage of the ring counter, the other stages remaining at comparatively low voltage. Thus, as successive binary numbers are fed into the system from the digital computer 57 the high voltage is shifted from stage A to B to C to D, the high voltage being relative to ground. The combined magnitude of a pulse from the digital computer and the high voltage on one of the conductors connected to the ring counter is sufficient to cause a field discharge through the electroluminescent and recording layers. Since the voltage which is applied sequentially to the electrodes connected to the ring counter is below the critical value required for field discharge and an additional pulse from the digital computer 57 is required to raise the electric stress between the virtually intersecting conductors above that critical value required for field discharge, recording and display of the pulse will occur only at the point of virtual intersection of actuated conductors.

In the event that a video signal is recorded and displayed on members 44 and 46 respectively, a much larger number of more closely spaced virtually intersecting conductors are utilized although the image is still recorded and displayed while these members are stationary. In this case, the conductors corresponding to conductors 52–55 in FIGURE 5 are tapped in along a delay line having its characteristics chosen so that it applies voltage to the conductors 52–55 etc., sequentially in synchronism with the vertical scan of a viewing camera. Conductors 47–51 are tapped in along a second delay line so as to synchronize the actuation of these conductors with the horizontal scan of the viewing camera. In order to superimpose image intensity variations during the scanning on one of these conductor sets a multi-grid vacuum tube is used as part of the circuit between the delay line and each conductor. By applying the image intensity pulse to one grid of the tube and the timing or scanning pulse to the other grid one set of conductors may be used both to scan the image and to vary its intensity. By limiting the image intensity input signals on one of the control grids to a level below that required to turn the tube on, the varying image intensity signal may be applied in parallel to all of the tubes since the magnitude of the scanning signal from the delay line which is applied sequentially to the second grids of adjacent tubes equals a value just below that required to turn the tube on. The combination of a small image intensity signal on one grid of the tube plus the signal from the delay line on the second grid of the tube will be sufficient to turn the tube on and cause field discharge between the conductor connected to this selected tube and any virtually intersecting conductors which are simultaneously actuated. When the image intensity signal is raised above the minimum which when added to the delay line voltage is required for field discharge between virtually intersecting actuated conductors a stronger current will flow resulting in higher field intensity through the electroluminescent layer, and a heavier charge deposition on the recording web. Since image brightness in electroluminescent materials is directly related to the applied field strength an increase in the image intensity signal will result in an increase in image brightness at the point of conduction. Alternatively, the delay line pulse may be used to switch off a diode shunted to ground from the grid of a triode thereby allowing the image intensity signal coming into the grid circuit to appear across the grid thus bringing the tube significantly above cut-off, and initiating an image-intensity signal controlled field discharge, or the tube grid may be biased below cut-off and the delay line pulse may be used to overcome this grid bias bringing the tube above cut-off while an amplified image intensity signal is use for plate modulation of the triode. Other switching techniques such as using beam deflection tubes, transistors, diodes, or the like, will occur to those skilled in the electrical switching arts. This allows the image intensity signal to be applied to the grid circuits of the triodes connected to all of the conductors since only the delay-line-actuated tube makes use of its input signal, to activate its conductor. Alternative actuating circuits and electrode configurations such as pin or bar matrices will occur to those skilled in the art of electrostatic printing.

In the embodiments disclosed above, the electroluminescent member in the gap between the electrodes is in the form of a flexible endless belt, specific sections of which are only excited at relatively wide time intervals so as to facilitate the removal of any charge which may deposit on this layer during excitation. When charge is removed quickly from the electroluminescent layer in the eelctrode gap this layer may be made in the form of a relatively small plate and kept stationary during operation. If desired, this plate is used to "write" into or trigger the persistron. One way of quickly removing any deposited charge from this layer is to cover it with a very thin coating of a grounded conductive anti-static compound as outlined above. This type of electroluminescent member may be used to particular advantage with apparatus of the type disclosed in FIGURE 5 since whole images are presented between intermittent feeding of the recording web allowing a short time for charge drainage.

Except for the cathode-ray tube embodiment of FIGURES 1–3, an A.C. potential ranging in frequency up to 40,000 cycles per second could be applied across the electrode gap since these higher frequencies will increase the brightness of the electroluminescent layer.

The particular apparatus described in this specification is intended as illustrative only. Various modifications will occur to those skilled in the art and are intended to be encompassed within the following claims:

What is claimed is:

1. A device for the visual presentation and permanent recording of information signals comprising, at least two spaced electrodes defining a gap, the electrodes on one side of said gap being transparent, an insulating recording web member and an electroluminescent member in said gap, said recording web member and said electroluminescent member being at least coextensive with said gap with said electroluminescent web between said insulating through said gap and said transparent electrode, means to move said recording web and means to selectively apply potential across said electrodes, said potential being of sufficient magnitude to initiate an electrical field discharge across said electrodes to form a latent electrostatic image on said recording web and simultaneously excite to luminescence that portion of said electroluminescent member corresponding in shape to said latent electrostatic image whereby a visible duplicate of said latent image may be seen through said transparent electrode.

2. Apparatus according to claim 1 including means to continuously move said recording and electroluminescent members through said gap during electrode actuation.

3. Apparatus according to claim 1 including means to move said recording and electroluminescent members through said gap between successive electrode actuations.

4. Apparatus according to claim 1 including an image light storage device outside of said electrode gap and adjacent to said electroluminescent member.

5. Apparatus according to claim 4 in which said image light storage device is a web comprising two thin transparent conductive members separated by a photoconductive layer and an electroluminescent layer, said photoconductive layer being positioned between the electroluminescent layer of said recording and display and the electroluminescent layer of said image light storage device, means to apply a varying voltage across the two conductive members of said image light storage device, and means to move said light storage device with respect to said gap.

6. Apparatus according to claim 2 in which that electrode of the recording and display device closest to the insulating recording member consists of a column of conductive pins embedded in an insulating matrix, said column being substantially perpendicular to the direction of travel of said members, means to sequentially actuate said pins in accordance with input signal characteristics and means to move said webs past said pin column in synchronism with the speed of successive actuations of the whole pin column.

7. Apparatus according to claim 6 in which the pin column and its associated insulating matrix are positioned in the face of a cathode ray tube envelope, said pins extending through both sides of said insulating matrix and wherein the means for sequentially actuating selected pins in said pin column constitutes an electron gun in said envelope for projecting a beam of electrons at said pin column, means to deflect said electron beam along the pin column and means to modulate said electron beam in accordance with a signal input.

8. Apparatus according to claim 2 in which the electrodes closest to the insulating recording web comprise an alphanumeric character cylinder and in which said means to apply voltage across said electrodes includes means to apply voltage pulses between the character columns in said alphanumeric cylinder and said transparent electrode when selected characters in said columns are opposite said recording web.

9. Apparatus according to claim 3 in which each of said spaced electrodes constitutes a number of non-intersecting conductors substantially in one plane, the planes of the two electrodes defining said gap, the conductors of one electrode being arrayed to virtually intersect the conductors of the opposing electrode and means responsive to input signals to apply potentials to selected conductors in said electrodes so as to establish a high electric field at the virtual point of activated conductor intersection.

10. Apparatus according to claim 1 including means to make recorded charge patterns on said insulating recording web permanent comprising, means to deposit finely divided electroscopic particles on said web in charge configuration and means to fix said particles on said recording web.

11. Apparatus according to claim 1 in which said transparent conductive electrode and said electroluminescent web are adjacent layers in an integral web.

12. A recording and display apparatus comprising a plurality of separate electrodes on a first side of a gap, at least one backing electrode on a second side of said gap said backing electrode being optically transparent, an insulating recording web in said gap and spaced from said plurality of electrodes, an electroluminescent member in said gap between said insulating recording web and said backing electrode and means to apply a voltage across selected electrodes on opposite sides of said gap, said voltage being of at least a magnitude to excite said electroluminescent layer to luminescence in the area between said selected electrodes.

13. A recording and display apparatus according to claim 12 in which said voltage is of a sufficient magnitude to initiate an electrical field discharge across said selected electrode to form a latent electrostatic image on said recording web and simultaneously excite to luminescence that portion of said electroluminescent member corresponding in shape to said latent electrostatic image.

14. A recording and display apparatus comprising a plurality of separate small electrodes on a first side of a gap, a broad optically transparent, backing electrode on a second side of said gap, said backing electrode being optically transparent and at least coextensive with said plurality of electrodes on the first side of said gap, an insulating recording web in said gap and spaced from said plurality of electrodes, an electroluminescent member in said gap between said insulating recording web and said backing electrode and means to apply a potential between selected electrodes on the first side of said gap and said backing electrode, said potential being of a sufficient magnitude to initiate an electrical field discharge between said selected electrodes and said backing electrode to form a latent electrostatic image on said recording web and simultaneously excite to luminescene that portion of said electroluminescent member corresponding in shape to the shape of selected electrodes facing said gap whereby a visible duplicate of said latent image may be seen through said transparent electrode.

15. A recording and display apparatus according to claim 14 in which said plurality of electrodes on said first side of said gap are shaped in the form of alphanumeric characters.

16. The method of simultaneously recording and displaying information comprising placing an insulating recording web and an electroluminescent member in a gap formed by a pair of spaced electrodes, at least one of which is optically transparent, with said electroluminescent member adjacent said transparent electrode and said recording web spaced slightly from the other of said electrodes and applying a voltage across said electrodes, said voltage being of a sufficient magnitude to initiate an ionizing field discharge thereacross whereby a latent electrostatic image is formed on said recording web and said electroluminescent member is excited to luminescence in a pattern corresponding to said latent electrostatic image.

17. A method according to claim 16 further including the steps of moving said recording web out from between said electrodes and developing said latent electrostatic image by depositing finely divided, electroscopic material thereon.

References Cited by the Examiner

UNITED STATES PATENTS

| | | | |
|---|---|---|---|
| 2,698,915 | 1/1955 | Piper | 340—173 |
| 2,764,693 | 9/1956 | Jacobs et al. | 346—74 |
| 2,805,360 | 9/1957 | McNaney | 340—173 |
| 2,882,419 | 4/1959 | Diemer et al. | 250—213 |
| 2,910,339 | 10/1959 | Eisler et al. | 346—74 |
| 2,919,171 | 12/1959 | Epstein | 346—74 |
| 2,920,232 | 1/1960 | Evans | 340—173 |
| 2,975,291 | 3/1961 | Loebner et al. | 340—173 |
| 3,076,393 | 2/1963 | Cambell et al. | 346—74 |
| 3,123,806 | 3/1964 | Alburger | 340—173 |

IRVING L. SRAGOW, *Primary Examiner.*